United States Patent
Nammoto et al.

(10) Patent No.: US 9,129,358 B2
(45) Date of Patent: Sep. 8, 2015

(54) INSPECTING APPARATUS, ROBOT APPARATUS, INSPECTING METHOD, AND INSPECTING PROGRAM

(71) Applicant: Seiko Epson Corporation, Tokyo (JP)

(72) Inventors: Takashi Nammoto, Sendai (JP); Koichi Hashimoto, Sendai (JP); Tomohiro Inoue, Sendai (JP)

(73) Assignee: Seiko Epson Corporation (JP)

( * ) Notice: Subject to any disclaimer, the term of this patent is extended or adjusted under 35 U.S.C. 154(b) by 225 days.

(21) Appl. No.: 13/753,794

(22) Filed: Jan. 30, 2013

(65) Prior Publication Data

US 2013/0195345 A1 Aug. 1, 2013

(30) Foreign Application Priority Data

Feb. 1, 2012 (JP) ................................ 2012-020145

(51) Int. Cl.
*G06K 9/00* (2006.01)
*G06T 7/00* (2006.01)

(52) U.S. Cl.
CPC ....... *G06T 7/001* (2013.01); *G06T 2207/10144* (2013.01); *G06T 2207/20221* (2013.01); *G06T 2207/30164* (2013.01)

(58) Field of Classification Search
None
See application file for complete search history.

(56) References Cited

U.S. PATENT DOCUMENTS

| 2008/0205747 A1* | 8/2008 | Kuchii ........................ 382/149 |
| 2009/0173561 A1* | 7/2009 | Moriguchi et al. ........... 180/167 |
| 2012/0026315 A1* | 2/2012 | Lee et al. ........................ 348/92 |

FOREIGN PATENT DOCUMENTS

| JP | 2000-162089 | 6/2000 |
| JP | 2011-165007 | 8/2011 |

* cited by examiner

*Primary Examiner* — Siamak Harandi
(74) *Attorney, Agent, or Firm* — Harness, Dickey & Pierce, P.L.C.

(57) ABSTRACT

An inspecting apparatus includes an image pickup unit configured to pick up a plurality of images of an inspection target object with different exposure times and generate, image data of an inspection target object image including an inspection region, a weighted-image-data generating unit configured to weight, for each of the image data generated with the exposure times different from one another, data of pixels indicating a region where a difference in gradation of pixel values is relatively large among regions of pixels included in the image data and generate weighted image data, an image-data combining unit configured to generate combined image data obtained by combining the generated respective weighted image data, and a determining unit configured to determine a state of the inspection region on the basis of image data of a reference image set and the generated combined image data.

12 Claims, 11 Drawing Sheets

INSPECTING APPARATUS, ROBOT APPARATUS, INSPECTING METHOD, AND INSPECTING PROGRAM

BACKGROUND

1. Technical Field

The present invention relates to an inspecting apparatus, a robot apparatus, an inspecting method, and an inspecting program.

2. Related Art

There is known a technique for performing inspection of an inspection target object on the basis of image recognition processing (see, for example, JP-A-2000-162089). An inspecting apparatus disclosed in the patent literature is an apparatus that generates a plurality of gradation images obtained by picking up images of the inspection target object while changing an exposure time and detects a defect of the inspection target object on the basis of a combined image obtained by combining the generated plurality of gradation images.

However, in the inspecting apparatus, when a difference between a non-defective product and a defective product is very small or when the material or the shape of the inspection target object or a photographing condition for the inspection target object changes, in some cases, it is difficult to set an exposure time for obtaining a combined image suitable for inspection. In this case, in the inspecting apparatus, it may be difficult to detect a defect of the inspection target object.

SUMMARY

An advantage of some aspects of the invention is to provide an inspecting apparatus, a robot apparatus, an inspecting method, and an inspecting program that can perform an external appearance inspection with high determination accuracy even when a difference between a non-defective product and a defective product is very small or even when the material or the shape of an inspection target object or a photographing condition for the inspection target object changes.

[1] An aspect of the invention is directed to an inspecting apparatus including: an image pickup unit configured to pick up a plurality of images of an inspection target object with different exposure times and generate, for each of the exposure times with which the images are picked up, image data of an inspection target object image including an inspection region, which is an image region equivalent to an inspection part of the inspection target object; a weighted-image-data generating unit configured to weight, for each of the image data generated with the exposure times different from one another, data of pixels indicating a region where a difference in gradation of pixel values is relatively large among regions of pixels included in the image data and generate weighted image data; an image-data combining unit configured to generate combined image data obtained by combining the generated respective weighted image data; and a determining unit configured to determine a state of the inspection region on the basis of a reference image set as an inspection reference for the inspection part and the generated combined image data. A portion having clear gradation in the image data indicates a portion including a lot of information necessary for determining the quality of the inspection target object in the picked-up image data.

With such a configuration, the inspecting apparatus can perform an external appearance inspection with high determination accuracy even when a difference between a non-defective product and a defective product is very small or even when the material or the shape of the inspection target object or a photographing condition for the inspection target object changes.

[2] In the inspecting apparatus described in [1], the weighted-image-data generating unit may apply an arithmetic operation employing a Laplacian filter to the image data and generate the weighted image data.

With such a configuration, since the inspecting apparatus performs the weighting using the known Laplacian filter, the inspecting apparatus can generate the combined image data with a simple configuration.

[3] In the inspecting apparatus described in [1] or [2], the weighted-image-data generating unit may apply an arithmetic operation employing a Gaussian filter to the image data and generate the weighted image data.

With such a configuration, the inspecting apparatus can set, according to a characteristic of image data, a characteristic of a filter for generating the weighted image data. That is, the inspecting apparatus can set a peak of the characteristic of the filter to a pixel value of a region having a relatively large difference in gradation of the pixel values among regions of pixels included in the image data. Consequently, it is possible to highly accurately perform weighting according to the characteristic of the image data. In other words, the inspecting apparatus can perform an external appearance inspection with high determination accuracy even when a difference between a non-defective product and a defective product is very small or when the material or the shape of the inspection target object or a photographing condition for the inspection target object changes.

[4] In the inspecting apparatus described in any one of [1] to [3], the weighted-image-data generating unit may weight data of pixels indicating a region having relatively high chroma of pixel values among regions of pixels included in the image data and generate the weighted image data.

With such a configuration, the inspecting apparatus can perform an external appearance inspection with high determination accuracy even when it is difficult to determine a non-defective product and a defective product according to only gradation of luminance.

[5] Another aspect of the invention is directed to a robot apparatus including: an image pickup unit configured to pick up a plurality of images of an inspection target object with different exposure times and generate, for each of the exposure times with which the images are picked up, image data of an inspection target object image including an inspection region, which is an image region equivalent to an inspection part of the inspection target object; a weighted-image-data generating unit configured to weight, for each of the image data generated with the exposure times different from one another, data of pixels indicating a region where a difference in gradation of pixel values is relatively large among regions of pixels included in the image data and generate weighted image data; an image-data combining unit configured to generate combined image data obtained by combining the generated respective weighted image data; a determining unit configured to determine a state of the inspection region on the basis of image data of a reference image set as an inspection reference for the inspection part and the generated combined image data; and a robot main body configured to movably support at least the image pickup unit.

[6] In the robot apparatus described in [5], the weighted-image-data generating unit may apply an arithmetic operation employing a Laplacian filter to the image data and generate the weighted image data.

[7] In the robot apparatus described in [5] or [6], the weighted-image-data generating unit may apply an arithmetic operation employing a Gaussian filter to the image data and generate the weighted image data.

[8] In the robot apparatus described in any one of [5] to [7], the weighted-image-data generating unit may weight data of pixels indicating a region having relatively high chroma of pixel values among regions of pixels included in the image data and generate the weighted image data.

[9] The robot apparatus described in any one of [5] to [8] may further include: a pedestal section configured to support the robot main body; and a portable section configured to make the pedestal section portable.

With such a configuration, since the robot apparatus incorporates an inspecting apparatus and a control apparatus necessary for inspection, it is possible to reduce the size of the robot apparatus. The robot apparatus can perform inspection while changing a place using the portable section. Therefore, the robot apparatus can perform inspection concerning, for example, a large inspection target object that may not be easily moved.

[10] Still another embodiment of the invention is directed to an inspecting method including: picking up a plurality of images of an inspection target object with different exposure times and generating, for each of the exposure times with which the images are picked up, image data of an inspection target object image including an inspection region, which is an image region equivalent to an inspection part of the inspection target object; weighting, for each of the image data generated with the exposure times different from one another, data of pixels indicating a region where a difference in gradation of pixel values is relatively large among regions of pixels included in the image data and generating weighted image data; generating combined image data obtained by combining the generated respective weighted image data; and determining a state of the inspection region on the basis of a reference image set as an inspection reference for the inspection part picked up in advance and the generated combined image data.

[11] Yet another aspect of the invention is directed to an inspecting program for causing a computer to function as: an image pickup unit configured to pick up a plurality of images of an inspection target object with different exposure times and generate, for each of the exposure times with which the images are picked up, image data of an inspection target object image including an inspection region, which is an image region equivalent to an inspection part of the inspection target object; a weighted-image-data generating unit configured to weight, for each of the image data generated with the exposure times different from one another, data of pixels indicating a region where a difference in gradation of pixel values is relatively large among regions of pixels included in the image data and generate weighted image data; an image-data combining unit configured to generate combined image data obtained by combining the generated respective weighted image data; and a determining unit configured to determine a state of the inspection region on the basis of a reference image set as an inspection reference for the inspection part picked up in advance and the generated combined image data.

Therefore, according to the aspects of the invention, it is possible to perform an external appearance inspection with high determination accuracy even when a difference between a non-defective product and a defective product is very small or even when the material or the shape of an inspection target object or a photographing condition for the inspection target object changes.

BRIEF DESCRIPTION OF THE DRAWINGS

The invention will be described with reference to the accompanying drawings, wherein like numbers reference like elements.

DESCRIPTION OF EXEMPLARY EMBODIMENTS

Modes for carrying out the invention are explained in detail below with reference to the accompanying drawings.

First Embodiment

Figure 1:
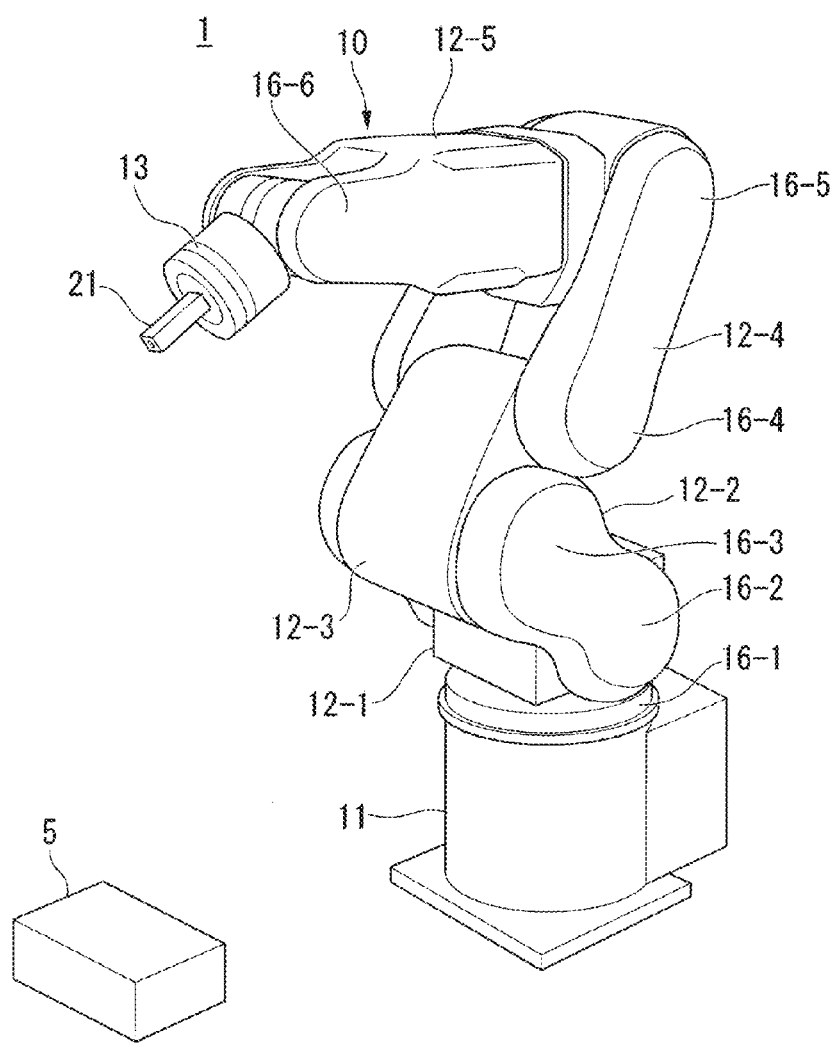
FIG. 1 is a schematic external view of a robot main body in a robot apparatus according to a first embodiment of the invention and an inspection target object.

FIG. 1 is a schematic external view of a robot main body in a robot apparatus according to a first embodiment of the invention and an inspection target object. As shown in the figure, a robot apparatus 1 includes a robot main body 10 provided with an image pickup unit 21.

The robot apparatus 1 includes link sections 12-1 to 12-5, joint sections 16-1 to 16-6, and a link section 13. The link section 12-1 is coupled to a supporting table 11 via the joint section 16-1. The link section 12-2 is coupled to the link section 12-1 via the joint section 16-2. The link section 12-3 is coupled to the link section 12-2 via the joint section 16-3. The link section 12-4 is coupled to the link section 12-3 via the joint section 16-4. The link section 12-5 is coupled to the link section 12-4 via the joint section 16-5. That is, the link section 12-5 is coupled to the supporting table 11 via the link sections 12-1 to 12-4 and the joint sections 16-1 to 16-5 to be capable of turning and capable of bending and stretching. The link section 13 is coupled to the link section 12-5 via the joint section 16-6 to be capable of pivoting and capable of swinging. The image pickup unit 21 is fixed to the link section 13 via a coupling section. In the following explanation, since the link sections have the same configuration and the joint sections have the same configuration, the link sections 12-1 to 12-5 are represented as link sections 12 and the joint sections 16-1 to 16-6 are represented as joint sections 16.

As explained above, the robot main body 10 is, for example, a six-axis vertical multi-joint robot. The robot main body 10 has a degree of freedom of six axes according to associated actions of the supporting table 11, the link sections 12, and the link section 13. The robot main body 10 can freely change the position and the direction thereof in a three-dimensional space.

The robot main body 10 may replace the image pickup unit 21, a tool, a component, and the like according to a purpose of work. A degree of freedom of the robot main body 10 is not limited to the degree of freedom by the six axes. The supporting table 11 may be set in a place fixed with respect to the ground such as a wall or a ceiling. The robot main body 10 may include a plurality of arm sections and a plurality of hand sections for supporting a tool and a component (not shown), in addition to the link section 12 and the link section 13 for supporting the image pickup unit 21. The robot main body 10 may be configured to move the arm sections and the hand sections independently from one another or in association with one another.

As shown in FIG. 1, for example, in a movable range of the distal end of the link section 13 of the robot main body 10, an inspection target object 5, which is a target object of an external appearance inspection, is placed on a not-shown table. The inspection target object 5 includes an inspection part.

In short, the robot apparatus according to this embodiment is an apparatus that inspects the external appearance of the inspection target object 5 and determines a state of the inspection part, for example, whether an inspection object is present in the inspection part.

Figure 2:
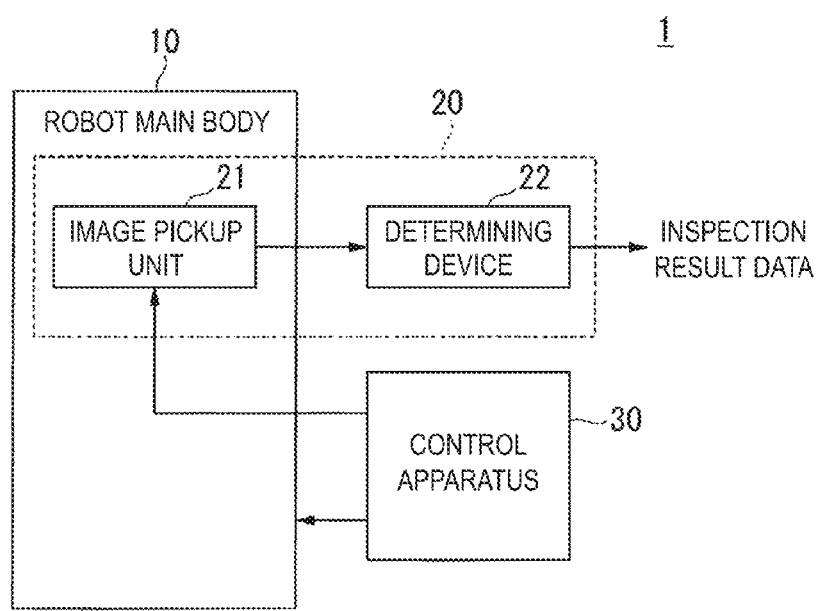
FIG. 2 is a block diagram showing a schematic functional configuration of the robot apparatus according to the embodiment.

FIG. 2 is a block diagram showing a schematic functional configuration of the robot apparatus according to this embodiment.

As shown in the figure, the robot apparatus 1 includes the robot main body 10, an inspecting apparatus 20, and a control apparatus 30. As shown in FIG. 1, the robot main body 10 includes the image pickup unit 21 and the link sections 12.

The control apparatus 30 transmits control signals such as an image pickup start request signal and an image pickup stop request signal to the image pickup unit 21. The control apparatus 30 drives the link sections 12 to control the posture of the robot main body 10 in order to change a photographing direction in a three-dimensional space of the image pickup unit 21.

The image pickup unit 21 picks up a plurality of images of the inspection target object 5 with different exposure times and generates, for each of the exposure times with which the images are picked up, image data of the inspection target object image including an inspection region, which is an image region equivalent to the inspection part of the inspection target object. The image pickup unit 21 in this embodiment is, for example, a still image camera device that can set an exposure time for image pickup on the basis of an exposure time decided in advance and perform monochrome photographing or color photographing for picking up an image of the inspection target object 5 and outputting image data. For example, the image pickup unit 21 picks up images with a first exposure time (e.g., 1/10 second), a second exposure time (e.g., 1/20 second), and a third exposure time (e.g., 1/30 second) decided in advance. The image pickup unit 21 may be a video camera device. The image pickup unit 21 picks up an image of the inspection target object 5 shown in the figure according to the image pickup start request signal supplied from the control apparatus 30 and outputs image data of the image. The image pickup unit 21 stops the image pickup operation according to the image pickup stop request signal supplied from the control apparatus 30.

The inspecting apparatus 20 includes a determining device 22 and the image pickup unit 21.

The determining device 22 captures, sequentially or at an interval of a plurality of frames, a plurality of image data picked up with different exposure times and sequentially output by the image pickup unit 21. The determining device 22 outputs inspection result data obtained by determining a state of the inspection region on the basis of a reference image set as an inspection reference of the inspection part picked up in advance and the captured image data.

Figure 3:
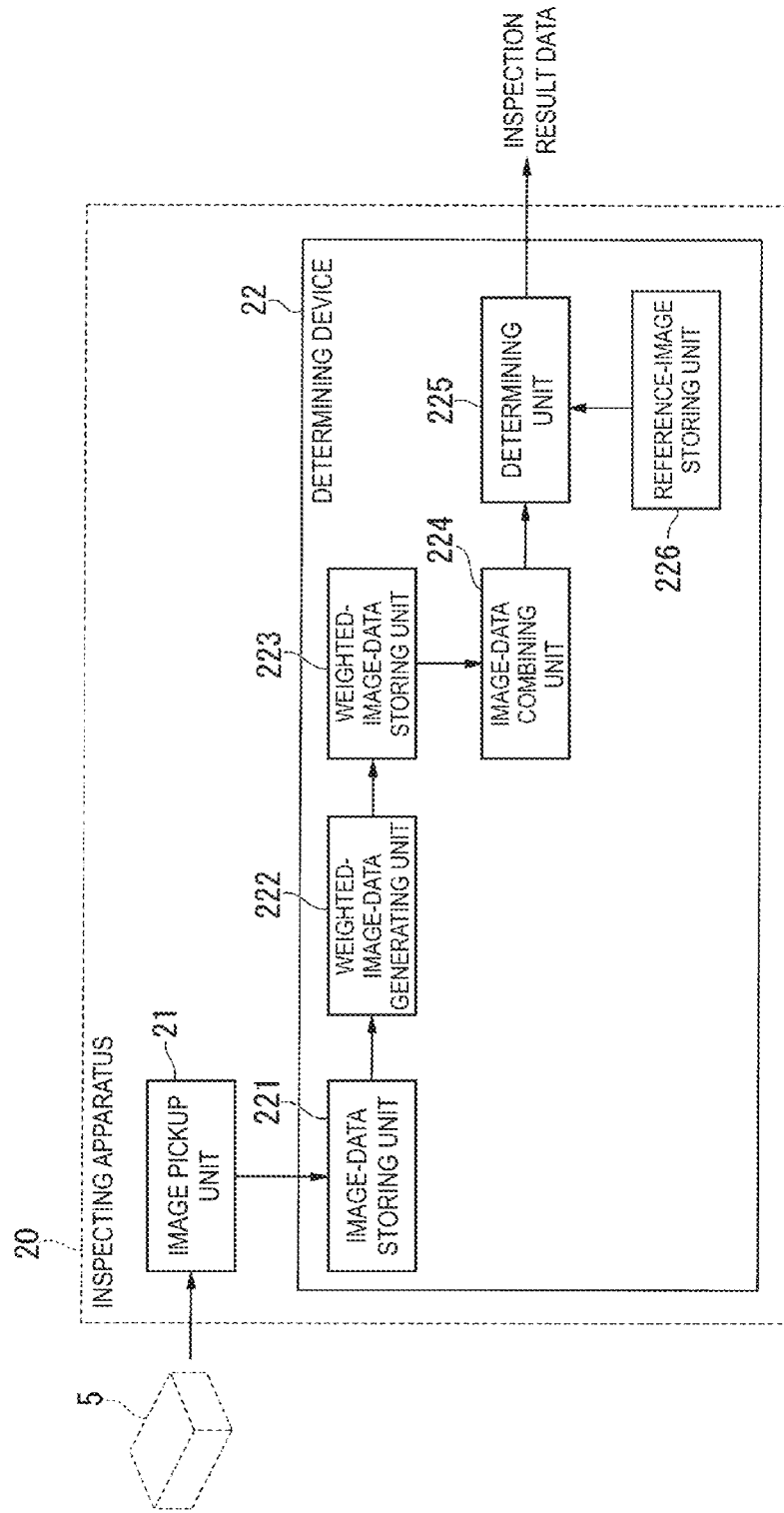
FIG. 3 is a block diagram showing a functional configuration of an inspecting apparatus according to the embodiment.

FIG. 3 is a block diagram showing a functional configuration of the inspecting apparatus 20.

As explained above, the inspecting apparatus 20 includes the image pickup unit 21 and the determining device 22.

The determining device 22 includes an image-data storing unit 221, a weighted-image-data generating unit 222, a weighted-image-data storing unit 223, an image-data combining unit 224, a determining unit 225, and a reference-image storing unit 226.

In the image-data storing unit 221, image data generated by the image pickup unit 21 is stored. In the image-data storing unit 221 in this embodiment, a plurality of image data picked up with different exposure times and sequentially output by the image pickup unit 21, for example, first image data picked up with the first exposure time is stored. Similarly, in the image-data storing unit 221, second image data picked up with the second exposure time and third image data picked up with the third exposure time are stored.

The weighted-image-data generating unit 222 sequentially reads out, for each of the exposure times, the image data stored in the image-data storing unit 221. The weighted-image-data generating unit 222 weights, for each of the image data generated with the exposure times different from one another, data of pixels indicating a region where a difference in gradation of pixel values is relatively large among regions of pixels included in the image data and generates weighted image data. A portion having clear gradation in the image data indicates a portion including a lot of information necessary for determining the quality of the inspection target object in the picked-up image data.

For example, the weighted-image-data generating unit 222 in this embodiment generates first weighted image data weighted with luminance values of pixels indicating a portion having clear gradation in the first image data. Similarly, the weighted-image-data generating unit 222 generates second weighted image data and third weighted image data respectively concerning the second image data and the third image data. The weighted-image-data generating unit 222 in this embodiment generates, for example, weighted image data weighted by setting the luminance values of the pixels indicating the portion having clear gradation in the image data large with respect peripheral pixels. The weighted-image-data generating unit 222 causes the weighted-image-data storing unit 223 to store the generated weighted image data. Details of the configuration of the weighted-image-data generating unit 222 are explained below.

The image-data combining unit 224 reads out the respective weighted image data stored in the weighted-image-data storing unit 223 and generates combined image data obtained by combining the read-out weighted image data. For example, the image-data combining unit 224 in this embodiment reads out the weighted image data stored in the weighted-image-data storing unit 223, adds up luminance values of corresponding pixels of the read-out first weighted image data to third weighted image data, and generates combined image data.

In the reference-image storing unit 226, reference image data set as an inspection reference for the inspection part is stored in advance. In the reference-image storing unit 226 in this embodiment, for example, image data of a non-defective product, which is a reference for inspection of the inspection target object 5, is stored in advance as the reference image data. As an image used as the reference image data, there are an image obtained by combining images obtained by photographing the non-defective product while changing an exposure time or an image obtained by photographing the non-defective product by setting photographing conditions such as lighting to make a difference between the non-defective product and a defective product conspicuous.

The determining unit 225 determines a state of the inspection region on the basis of the reference image data set as the inspection reference for the inspection part and the generated combined image data. The determining unit 225 in this embodiment reads out the reference image data stored in the reference-image storing unit 226 and calculates a degree of similarity between the combined image data generated by the image-data combining unit 224 and the read-out reference image data. When the calculated degree of similarity is larger than a predetermined value (i.e., the degree of similarity between the combined image data and the reference image data is large), the determining unit 225 determines that the inspection target object 5 is a non-defective product. On the other hand, when the calculated degree of similarity is smaller than the predetermined value (i.e., the degree of similarity between the combined image data and the reference image data is small), the determining unit 225 determines that the inspection target object 5 is a defective product.

A plurality of image data picked up by the image pickup unit 21 with different exposure times are explained with reference to FIGS. 4 to 6.

Figure 4:
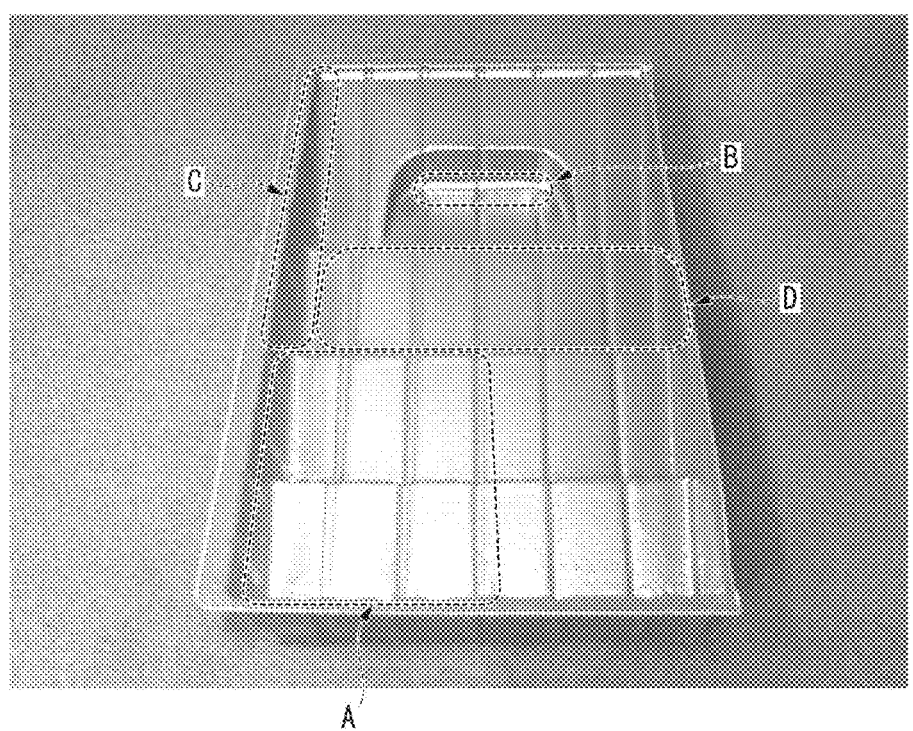
FIG. 4 is a diagram showing an example of first image data picked up by an image pickup unit in the embodiment.

FIG. 4 is a diagram showing an example of first image data picked up by the image pickup unit 21.

As explained above, the image pickup unit 21 picks up the first image data with an exposure time of, for example, 1/10 second. In this case, average luminance of the first image data may be high. For example, as shown in an A part and a B part in the figure, there are portions where a difference between luminance values of pixels in the vicinity is small and it is difficult to detect the shape of the inspection target object 5. On the other hand, in the first image data, for example, as shown in a C part and a D part in the figure, there are portions where a difference between luminance values of pixels in the vicinity is large and it is easy to detect the shape of the inspection target object 5. In other words, a portion having clear gradation in the first image data is a portion where it is easy to detect the shape of the inspection target object 5. In this way, in the image data picked up by the image pickup unit 21, depending on conditions during image pickup, there are the portion where it is easy to detect the shape of the inspection target object 5 and the portion where it is difficult to detect the shape of the inspection target object 5.

Figure 5:
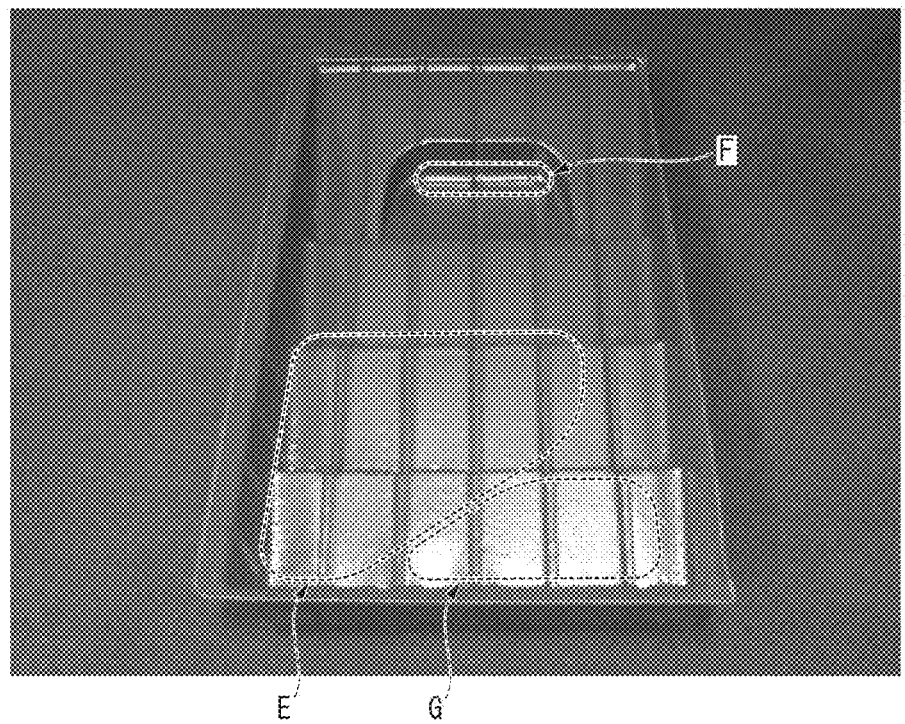
FIG. 5 is a diagram showing an example of second image data picked up by the image pickup unit in the embodiment.

FIG. 5 is an example of second image data picked up by the image pickup unit 21.

As explained above, the image pickup unit 21 picks up the second image data with an exposure time of, for example, 1/20 second. In this case, the second image data has low average luminance compared with the first image data. Therefore, it is seen that, in the second image data, for example, as shown in an E part and an F part in the figure, it is easy to detect the shape of the inspection target object 5 concerning portions corresponding to the A part and the B part where it is difficult to detect the shape of the inspection target object 5 in the first image data. However, in the second image data, as in the first image data, for example, as shown in a G part in the figure, there is a portion where it is difficult to detect the shape of the inspection target object 5.

Figure 6:
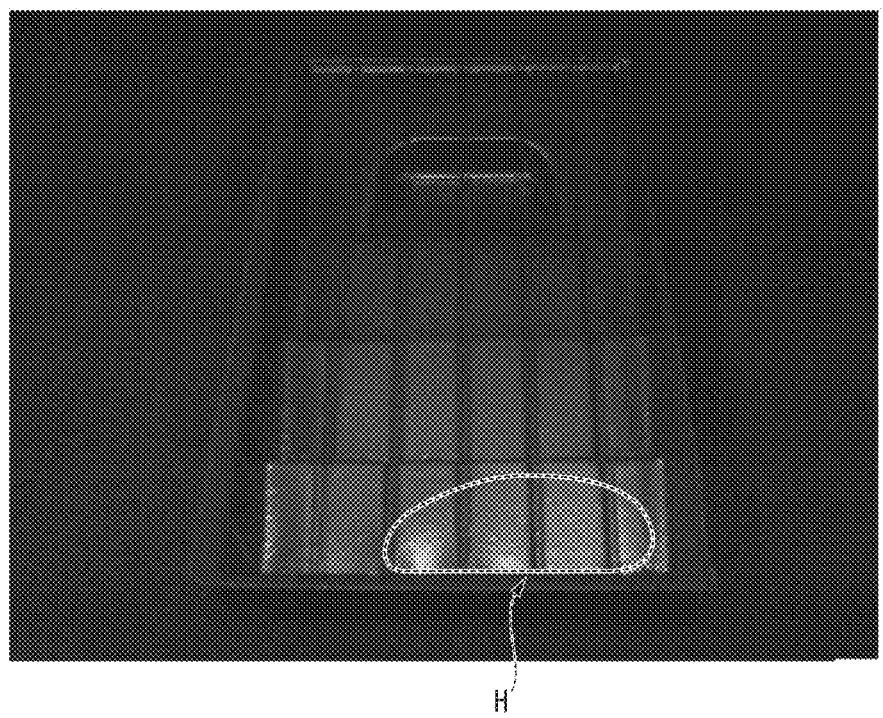
FIG. 6 is a diagram showing an example of third image data picked up by the image pickup unit in the embodiment.

FIG. 6 is an example of third image data picked up by the image pickup unit 21.

As explained above, the image pickup unit 21 picks up the third image data with an exposure time of, for example, 1/30 second. In this case, the third image data has a small average luminance compared with the second image data. Therefore, it is seen that, in the third image data, for example, as shown in an H part in the figure, it is easy to detect the shape of the inspection target object 5 concerning a portion corresponding to the G part where it is difficult to detect the shape of the inspection target object 5 in the second image data.

In this way, the image pickup unit 21 in this embodiment generates image data obtained by picking up a plurality of images of the inspection target object 5 with different exposure times such that a portion where it is easy to detect the shape of the inspection target object 5 is included in any one of the image data.

The configuration of the weighted-image-data generating unit 222 that generates weighted image data is explained.

As explained above, the weighted-image-data generating unit 222 reads out, for each of the exposure times with which the image data is picked up, the image data stored in the image-data storing unit 221. The weighted-image-data generating unit 222 weights data of pixels indicating a portion having clear gradation in the read-out image data and generates weighted image data. For example, the weighted-image-data generating unit 222 in this embodiment applies an arithmetic operation employing the known Laplacian filter to the read-out first image data and generates first weighted image data. The Laplacian filter extracts pixels included in a region where a difference among pixel values is relatively large among regions of pixels included in input image data and outputs image data formed by the extracted pixels.

Specifically, for example, the weighted-image-data generating unit 222 applies the Laplacian filter to luminance values of pixels of the read-out first image data and generates weight image data. Subsequently, the weighted-image-data generating unit 222 multiplies together luminance values of the pixels of the generated weight image data and the luminance values of the pixels of the read-out first image data and generates first weighted image data. The weighted-image-data generating unit 222 applies the Laplacian filter to luminance values of pixels of read-out second image data, generates weight image data, multiplies together luminance values of the pixels of the generated weight image data and the luminance values of the pixels of the second image data, and generates second weighted image data. The weighted-image-data generating unit 222 generates third weighted image data in the same manner. The weighted-image-data generating unit 222 may further apply smoothing processing to the image data obtained by applying the Laplacian filter to the luminance values of the pixels of the read-out image data to thereby generate, as weighted image data, images obtained by expanding edge portions of images included in the weight image data.

As explained above, the weighted-image-data generating unit 222 performs the arithmetic operation employing the Laplacian filter to thereby weight data (luminance values) of pixels indicating a portion having clear gradation of luminance values of input image data and generate weighted image data. In other words, the weighted-image-data generating unit 222 can extract a portion where it is easy to detect the shape of the inspection target object 5 out of the input image data.

In this embodiment, gradation of luminance values is used. However, gradation of chroma may be used according to the shape, the material, and the like of the inspection target object 5.

The image-data combining unit 224 that generates combined image data is explained with reference to FIG. 7.

Figure 7:
FIG. 7 is a diagram showing an example of combined image data generated by an image-data combining unit in the embodiment.

FIG. 7 is a diagram showing an example of combined image data generated by the image-data combining unit 224.

The image-data combining unit 224 adds up luminance values of corresponding pixels of, for example, the first weighted image data, the second weighted image data, and the third weighted image data generated by the weighted-image-data generating unit 222. As explained above, the weighted-image-data generating unit 222 extracts a portion where it is easy to detect the shape of the inspection target object 5 out of input image data and generates weighted image data. This means that the image-data combining unit 224 combines, among image data generated by the image pickup unit 21, weighted image data indicating the portion where it is easy to detect the shape of the inspection target object 5.

As explained above, the inspecting apparatus 20 according to this embodiment automatically extracts, using the known Laplacian filter, a portion where it is easy to detect the shape of the inspection target object 5 out of image data picked up with a plurality of exposure times and generates combined image data in which it is easy to detect the shape of the inspection target object 5. When combining weighted image data, the inspecting apparatus 20 may set a correction value for each of the weighted image data and combine the weighted image data after adding the set correction value to luminance values of pixels of the weighted image data. In this way, the inspecting apparatus 20 may combine the weighted image data such that a change in the luminance values of the pixels is smooth in a boundary portion of each of regions weighted by the weighted image data. In this case, the correction value may be set according to, for example, average luminance of original images of weighted images.

The operation of the inspecting apparatus 20 in this embodiment is explained.

Figure 8:
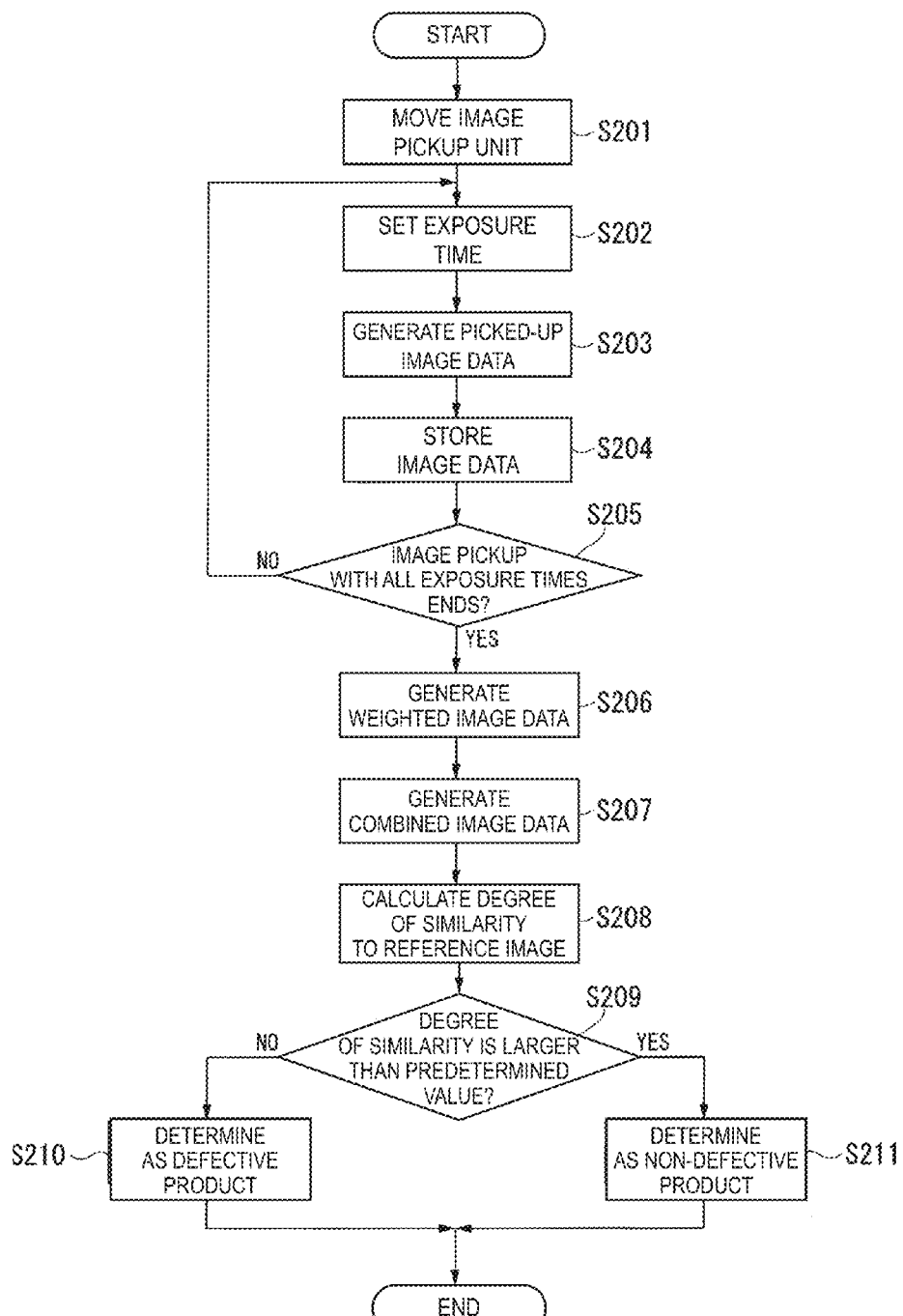
FIG. 8 is a flowchart for explaining an example of the operation of the inspecting apparatus according to the embodiment.

FIG. 8 is a flowchart for explaining an example of the operation of the inspecting apparatus 20.

First, the control apparatus 30 controls the link sections 12 of the robot main body 10 to move the position of the image pickup unit 21 to a position where the image pickup unit 21 can pick up an image of the inspection region of the inspection target object 5 (step S201). In this embodiment, the inspection target object 5 is arranged in, for example, a position decided in advance. The control apparatus 30 moves the image pickup unit 21 to an image pickup position according to amounts of movement of the link sections 12 stored in advance.

Subsequently, the image pickup unit 21 sets an exposure time (step S202). The image pickup unit 21 in this embodiment sets, as the exposure time, for example, a first exposure time (e.g., ¹⁄₁₀ second) decided in advance.

The image pickup unit 21 picks up images of the inspection target object 5 and generates image data (e.g., first image data) of an inspection target object image including an inspection region, which is an image region equivalent to the inspection part of the inspection target object 5 (step S203).

The image pickup unit 21 causes the image-data storing unit 221 to store the generated image data (e.g., first image data) (step S204).

The image pickup unit 21 determines whether image pickup with all exposures times with which images should be picked up ends (step S205). For example, the image pickup unit 21 in this embodiment determines whether image pickup with all exposure times from the first exposure time to a third exposure time decided in advance ends. When determining that the image pickup with all the exposure times ends (YES in step S205), the image pickup unit 21 advances the processing to step S206. When determining that the image pickup with all the exposure times does not end (NO in step S205), the image pickup unit 21 returns the processing to step S202. For example, when only image pickup with the first exposure time ends, the image pickup unit 21 repeats the processing from step S202 to step S204 and performs image pickup with the second exposure time and the third exposure time.

Subsequently, the weighted-image-data generating unit 222 reads out image data from the image-data storing unit 221, weights data of pixels indicating a portion having clear gradation in the read-out image data, and generates weighted image data (step S206). For example, the weighted-image-data generating unit 222 in this embodiment reads out the first image data from the image-data storing unit 221 and generates first weighted image data. For example, the weighted-image-data generating unit 222 in this embodiment applies the Laplacian filter to luminance values of pixels included in the first image data and generates a weight image. The weighted-image-data generating unit 222 multiplies together luminance values of the pixels of the generated weight image and the luminance values of the pixels of the first image data and generates the first weighted image data.

Similarly, for example, the weighted-image-data generating unit 222 reads out second image data and third image data from the image-data storing unit 221 and generates second weighted image data and third weighted image data.

The weighted-image-data generating unit 222 causes the weighted-image-data storing unit 223 to store the generated weighted image data.

Subsequently, the image-data combining unit 224 reads out the weighted image data from the weighted-image-data storing unit 223 and generates combined image data obtained by combining the weighted image data (step S207). For example, the image-data combining unit 224 in this embodiment reads out the first weighted image data, the second weighted image data, and the third weighted image data from the weighted-image-data storing unit 223. The image-data combining unit 224 adds up luminance values of corresponding pixels of the read-out weighted image data to thereby generate combined image data.

Subsequently, the determining unit 225 calculates a degree of similarity between a reference image set as an inspection reference for the inspection part and the generated combined image data (step S208). The determining unit 225 in this embodiment calculates, according to the known pattern matching method, a degree of similarity between a reference image read out from the reference-image storing unit 226 and the combined image data.

The determining unit 225 determines whether the degree of similarity calculated in step S208 is larger than a predetermined value (step S209). When determining that the calculated degree of similarity is larger than the predetermined value (YES in step S209), the determining unit 225 determines that the inspection target object 5 is a non-defective product (step S211) and ends the processing. When determining that the calculated degree of similarity is not larger than the predetermined value (NO in step S209), the determining unit 225 determines that the inspection target object 5 is a defective product (step S210) and ends the processing.

As explained above, the inspecting apparatus 20 included in the robot apparatus 1 according to the first embodiment of the invention includes the image pickup unit 21, the weighted-image-data generating unit 222, the image-data combining unit 224, and the determining unit 225. The image pickup unit 21 picks up a plurality of images of the inspection target object 5 with different exposure times and generates, for each of the exposure times with which the images are picked up, image data of an inspection target object image including an inspection region, which is an image region equivalent to the inspection part of the inspection target object 5. The weighted-image-data generating unit 222 weights, for each of the image data generated with the exposure times different from one another, data of pixels indicating a region where a difference in gradation of pixel values is relatively large among regions of pixels included in the image data and generates weighted image data. The image-data combining unit 224 generates combined image data obtained by combining the generated respective weighted image data. The image-data combining unit 224 determines a state of the inspection region on the basis of the reference image set as the inspection reference for the inspection part and the generated combined image data.

In general, in picking up images of an inspection target object, for example, even if exposure times are set according to the material or the shape of the inspection target object or a photographing condition for the inspection target object, the image pickup unit 21 sometimes cannot set a luminance value of entire image data to a value appropriate for inspection. For example, in picked-up image data, a luminance value is sometimes excessively large (or small) in a part of regions of pixels included in the image data. The region where the luminance value is excessively large (or small) is sometimes a portion not including a lot of information necessary for determining the quality of the inspection target object compared with the other regions among the pixels included in the image data. In this case, in the picked-up image data, there a portion including a lot of information necessary for determining the quality of the inspection target object (e.g., a portion where it is easy to detect the shape of the inspection target object 5) and a portion not including a lot of the information.

On the other hand, the inspecting apparatus 20 and the robot 1 including the inspecting apparatus 20 according to this embodiment can automatically extract a portion including a lot of information necessary for determining the quality of the inspection target object out of a plurality of image data picked up with different exposure times and compare the portion with the reference image and determine the quality of the inspection target object. Consequently, the inspecting apparatus 20 and the robot apparatus 1 including the inspecting apparatus 20 can perform an external appearance inspection with high determination accuracy even when a difference between a non-defective product and a defective product is very small or when the material or the shape of the inspection target object or a photographing condition for the inspection target object changes.

The weighted-image-data generating unit 222 of the inspecting apparatus 20 applies the arithmetic operation employing the Laplacian filter to image data and generates weighted image data.

As explained above, the inspecting apparatus 20 according to this embodiment performs weighting using the known Laplacian filter. Therefore, the inspecting apparatus 20 can generate combined image data with a simple configuration.

In this embodiment, gradation of luminance values is used. However, gradation of chroma may be used according to the shape, the material, and the like of the inspection target object 5. For example, the weighted-image-data generating unit 222 may weight data of pixels indicating a region where chroma of pixel values is relatively high among regions of pixels included in image data and generate weighted image data. Consequently, the inspecting apparatus 20 and the robot apparatus 1 including the inspecting apparatus 20 according to this embodiment can perform an external appearance inspection with high determination accuracy even when it is difficult to determine a non-defective product and a defective product according to only gradation of luminance.

Second Embodiment

The inspecting apparatus 20 included in the robot apparatus 1 according to the first embodiment has the configuration in which the weighted-image-data generating unit 222 generates weighted image data using the Laplacian filter. The inspecting apparatus 20 included in the robot apparatus 1 according to a second embodiment of the invention has a configuration in which a weighted-image-data generating unit 222a generates weighted image data using a Gaussian filter. The Gaussian filter extracts pixels having luminance values in a predetermined range among pixels included in input image data and outputs image data formed by the extracted pixels.

The inspecting apparatus 20 according to this embodiment is explained below with reference to FIGS. 9 and 10. In this embodiment, components same as the components in the first embodiment are denoted by the same reference numerals and signs and explanation of the components is omitted.

Figure 9:
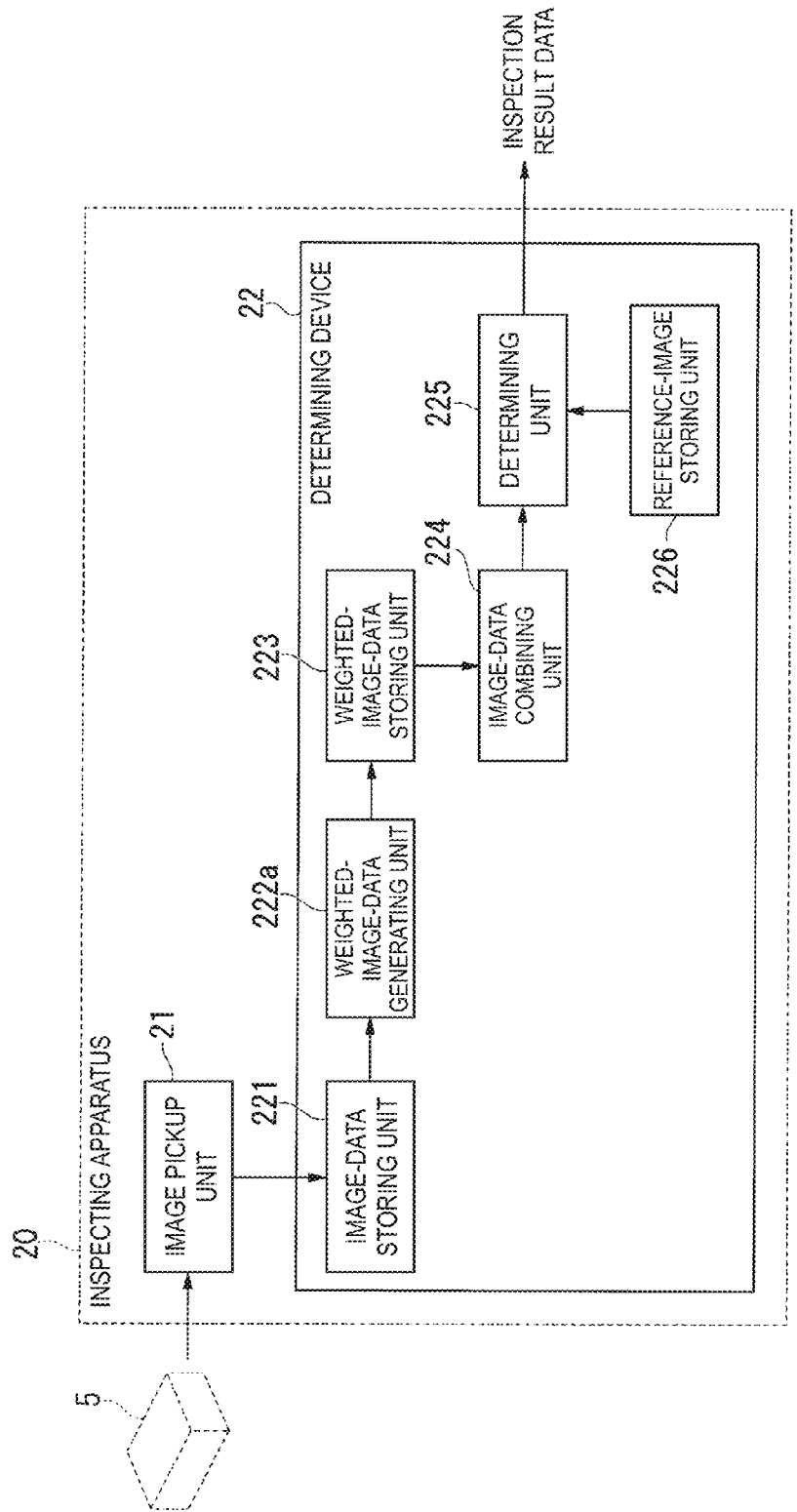
FIG. 9 is a block diagram showing a functional configuration of an inspecting apparatus included in a robot apparatus according to a second embodiment of the invention.

FIG. 9 is a block diagram showing a functional configuration of the inspecting apparatus 20 according to this embodiment.

The inspecting apparatus 20 according to this embodiment includes the weighted-image-data generating unit 222a.

The weighted-image-data generating unit 222a generates weighted image data from image data as explained below.

First, the weighted-image-data generating unit 222a reads out image data from the image-data storing unit 221 and generates an edge image of the read-out image data. For example, the weighted-image-data generating unit 222a in this embodiment applies a differential filter to luminance values of pixels included in the read-out image data and generates the edge image.

The weighted-image-data generating unit 222a detects the luminance of pixels included in a region where a space frequency is high in the generated edge image. For example, the weighted-image-data generating unit 222a in this embodiment applies Fourier transform to regions of the generated edge image, calculates space frequencies of the regions, and detects luminance values of pixels included in a region having a high space frequency among the calculated space frequencies.

Further, for example, as shown in FIG. 9, the weighted-image-data generating unit 222a calculates, concerning the detected luminance values of the pixels, a frequency of appearance in a target region.

Figure 10:
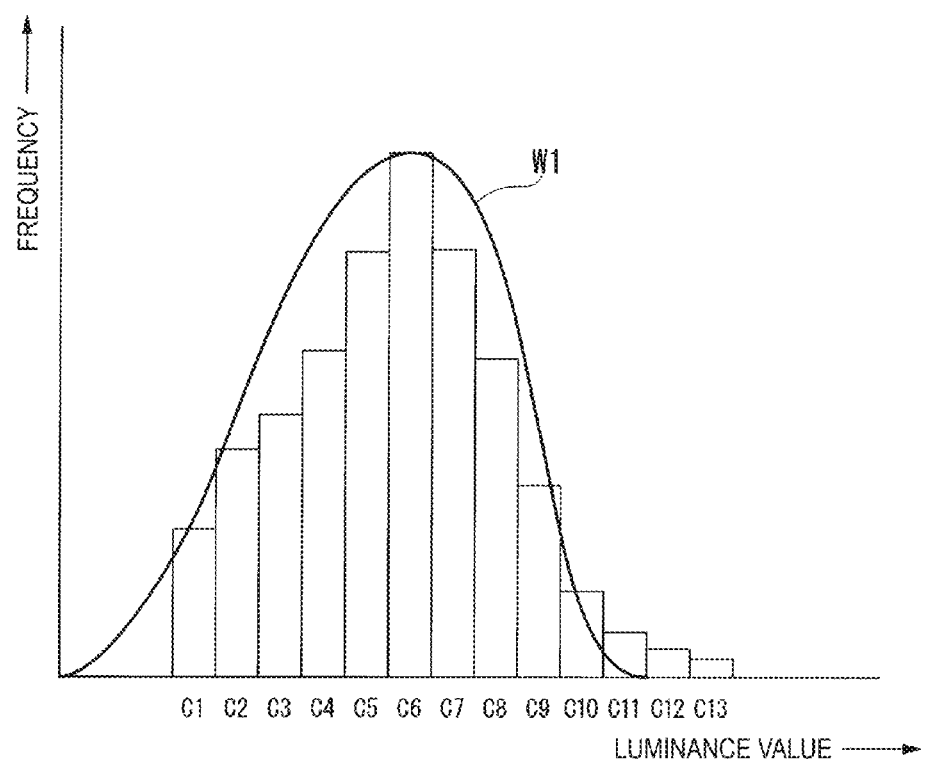
FIG. 10 is a graph showing an example of a histogram of luminance values detected by a weighted-image-data generating unit in the embodiment.

FIG. 10 is a graph showing an example of a histogram of luminance values detected by the weighted-image-data generating unit 222a.

As shown in FIG. 10, the weighted-image-data generating unit 222a in this embodiment stratifies luminance values of pixels in a target region into, for example, grades C1 to C13 and calculates a histogram in which the number of pixels having the luminance values included in the grades is set as a frequency.

The weighted-image-data generating unit 222a sets a mode (e.g., the grade C6) of the histogram as an average of the Gaussian filter and sets, as dispersion of the Gaussian filter, dispersion in which a predetermined rate (e.g., 90%) of the number of the pixels is included. In this way, the weighted-image-data generating unit 222a sets, for example, the Gaussian filter having a characteristic indicated by a curve W1 in FIG. 10.

The weighted-image-data generating unit 222a in this embodiment weights, using the Gaussian filter set in this way, data of pixels indicating a portion having clear gradation in the read-out image data and generates weighted image data.

As explained above, the inspecting apparatus 20 included in the robot apparatus 1 according to the second embodiment of the invention includes the weighted-image-data generating unit 222a that applies the arithmetic operation employing the Gaussian filter to image data and generates weighted image data.

With such a configuration, the inspecting apparatus 20 and the robot apparatus 1 including the inspecting apparatus according to this embodiment can set, according to a characteristic of image data, a characteristic of a filter for generating weighted image data. Consequently, the inspecting apparatus 20 and the robot apparatus 1 including the inspecting apparatus 20 can perform an external appearance inspection with high determination accuracy even when a difference between a non-defective product and a defective product is very small or when the material or the shape of an inspection target object or a photographing condition for the inspection target object changes.

In this embodiment, gradation of luminance values is used. However, gradation of chroma may be used according to the shape, the material, and the like of the inspection target object 5. For example, the weighted-image-data generating unit 222a may weight data of pixels indicating a region where chroma of pixel values is relatively high among regions of pixels included in image data and generate weighted image data. Consequently, the inspecting apparatus 20 and the robot apparatus 1 including the inspecting apparatus 20 according to this embodiment can perform an external appearance inspection with high determination accuracy even when it is difficult to determine a non-defective product and a defective product according to only gradation of luminance.

Third Embodiment

The robot apparatus 1 according to the first embodiment and the second embodiment has the configuration in which the supporting table 11 is fixed and set on the floor. A robot apparatus 1a according to a third embodiment of the invention has a configuration in which a pedestal section 14 supports a supporting table 11a and includes a portable section 15.

The robot apparatus 1a according to this embodiment is explained below with reference to FIG. 11. In this embodiment, components same as the components in the first and second embodiments are denoted by the same reference numerals and signs and explanation of the components is omitted.

Figure 11:
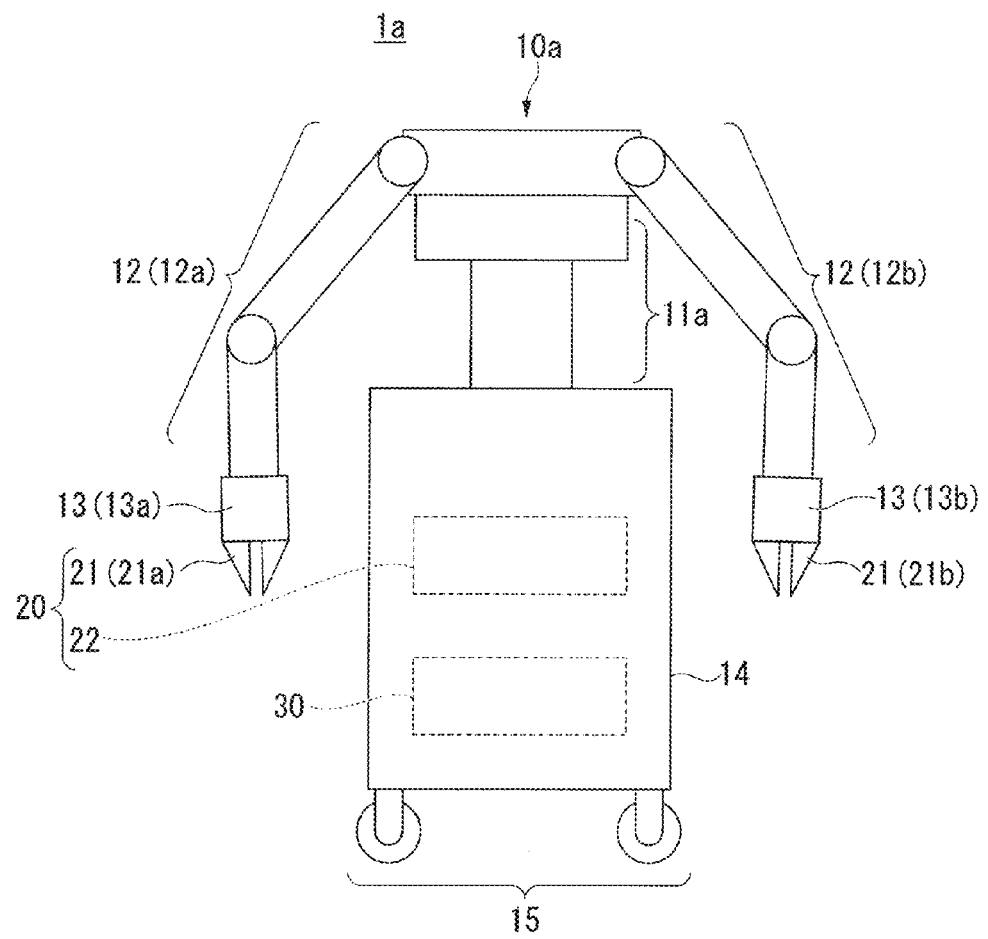
FIG. 11 is a schematic external view of a robot apparatus according to a third embodiment of the invention.

FIG. 11 is a schematic external view of the robot apparatus 1a according to the third embodiment of the invention.

As shown in the figure, the robot apparatus 1a includes a robot main body 10a, the pedestal section 14, and the portable section 15.

The robot main body 10a includes the supporting table 11a, a first link section 12a and a second link section 12b functioning as the link sections 12, and a first link section 13a and a second link sections 13b functioning as the link section 13.

The first link section 13a includes a first image pickup unit 21a functioning as the image pickup unit 21. Similarly, the second link section 13b includes a second image pickup unit 21b functioning as the image pickup unit 21.

The link sections 12 (e.g., the first link section 12a and the second link section 12b) are connected to the supporting table 11a. The supporting table 11a supports the link sections 12.

The pedestal section 14 supports the robot main body 10a via the supporting table 11a and stores the determining device 22 and the control apparatus 30.

The portable section 15 includes, for example, casters and makes the pedestal section 14 portable. In FIG. 11, the portable section 15 is configured to move the robot apparatus 1a on the floor surface. However, the portable section 15 may be configured to move the robot apparatus 1a on, for example, a wall surface or a ceiling.

As explained above, the robot apparatus 1a according to the third embodiment of the invention includes the pedestal section 14 that supports the robot main body 10a and the portable section 15 that makes the pedestal section 14 portable. The pedestal section 14 in this embodiment includes, on the inside thereof, the determining device 22 of the inspecting apparatus 20 and the control unit 30. Since the robot apparatus 1a according to this embodiment incorporates the inspecting apparatus 20 and the control apparatus 30 necessary for inspection in this way, it is possible to reduce the size of the robot apparatus 1a. The robot apparatus 1a according to this embodiment can perform inspection while changing a place using the portable section 15. Therefore, for example, the robot apparatus 1a can perform inspection concerning the inspection target object 5 having a large size that may not be easily moved.

The inspecting apparatus 20 and the units included in the inspecting apparatus 20 in the embodiments may be realized by dedicated hardware or may be realized by a memory and a microprocessor.

The units included in the inspecting apparatus 20 may be configured by memories and CPUs (central processing units). The functions of the units included in the inspecting apparatus 20 may be realized by loading a computer program for realizing the functions of the units to the memories and executing the computer program.

The processing by the units included in the inspecting apparatus 20 may be performed by recording the computer program for realizing the functions of the units of the inspecting apparatus 20 in a computer-readable recording medium and causing a computer system to read and execute the computer program recorded in the recording medium. The "computer system" includes an OS and hardware such as peripheral equipment.

If a WWW system is used, the "computer system" includes a webpage providing environment (or a display environment).

The "computer-readable recording medium" refers to a portable medium such as a flexible disk, a magneto-optical disk, a ROM, or a CD-ROM or a storage device such as a hard disk incorporated in the computer system. Further, the "computer readable recording medium" includes a medium that dynamically retains the computer program for a short time like a communication line for transmitting the computer program via a network such as the Internet or a communication line such as a telephone line and a medium that retains the computer program for a fixed time like a volatile memory on the inside of the computer system functioning as a server or a client when the computer program is transmitted. The computer program may be a computer program for realizing a part of the functions explained above. Further, the computer program may be a computer program that can realize the functions in combination with a computer program already recorded in the computer system.

The embodiments of the invention are explained above in detail with reference to the accompanying drawings. However, a specific configuration is not limited to the embodiments. Design and the like not departing from the spirit of the invention are also included in the specific configuration.

The entire disclosure of Japanese Patent Application No. 2012-020145 filed Feb. 1, 2012 is expressly incorporated by reference herein.

What is claimed is:

1. An inspecting apparatus comprising:
an image pickup camera device generating for each of different exposure times, image data including an inspection region, which is an image region equivalent to an inspection part of an inspection target object;
a weighted-image-data generating unit configured to weigh for each of the image data generated with the exposure times different from one another, pixel data based on a difference between a gradation of a first region and a gradation of a second region next to the first region and generate weighted image data;
an image-data combining unit configured to generate combined image data obtained by combining the generated respective weighted image data;
a determining unit configured to determine a state of the inspection region on the basis of image data of a reference image set as an inspection reference for the inspection part and the generated combined image data; and
one or more processors that are configured to perform as the weighted-image-data generating unit, the image-data combining unit, and the determining unit.

2. The inspecting apparatus according to claim 1, wherein the weighted-image-data generating unit performs an arithmetic operation employing a Laplacian filter and generates the weighted image data.

3. The inspecting apparatus according to claim 1, wherein the weighted-image-data generating unit performs an arithmetic operation employing a Gaussian filter and generates the weighted image data.

4. The inspecting apparatus according to claim 1, wherein the gradation of the first region and the gradation of the second region reflect chroma.

5. The inspecting apparatus according to claim 1, wherein the gradation of the first region and the gradation of the second region reflect luminance.

6. A robot apparatus comprising:
an image pickup camera device generating for each of different exposure times, image data including an inspection region, which is an image region equivalent to an inspection part of an inspection target object;
a weighted-image-data generating unit configured to weigh for each of the image data generated with the exposure times different from one another, pixel data based on a difference between a gradation of a first region and a gradation of a second region next to the first region and generate weighted image data;
an image-data combining unit configured to generate combined image data obtained by combining the generated respective weighted image data;
a determining unit configured to determine a state of the inspection region on the basis of image data of a reference image set as an inspection reference for the inspection part and the generated combined image data;
a robot main body configured to movably support at least the mage pickup device; and
one or more processors that are configured to perform as the weighted-image-data generating unit, the image-data combining unit, and the determining unit.

7. The robot apparatus according to claim 6, wherein the weighted-image-data generating unit performs an arithmetic operation employing a Laplacian filter and generates the weighted image data.

8. The robot apparatus according to claim 6, wherein the weighted-image-data generating unit performs an arithmetic operation employing a Gaussian filter and generates the weighted image data.

9. The robot apparatus according to claim 6, wherein the gradation of the first region and the gradation of the second region reflect chroma.

10. The robot apparatus according to claim 6, further comprising:
a pedestal section configured to support the robot main body; and
a portable section configured to make the pedestal section portable.

11. The robot apparatus according to claim 6, wherein the gradation of the first region and the gradation of the second region reflect luminance.

12. An inspecting method comprising:
generating, for each of different exposure times, image data including an inspection region, which is an image region equivalent to an inspection part of an inspection target object;
generating a weighted image for each of the image data generated with the exposure times different from one another,
weighing, for each of the image data generated with the exposure times different from one another, pixel data based on a difference between a gradation of a first region and a second region next to the first region and generating weighted image data;
generating combined image data obtained by combining the generated respective weighted image data; and
determining a state of the inspection region on the basis of image data of a reference image set as an inspection reference for the inspection part and the generated combined image data.

* * * * *